United States Patent [19]

Ferrari

[11] Patent Number: 4,986,306
[45] Date of Patent: Jan. 22, 1991

[54] SINGLE HANDLE MIXER VALVE WITH HARD MATERIAL PLATES, HAVING A MOVABLE PLATE SWINGING AROUND THE DELIVERY CONNECTION

[75] Inventor: Leopoldo Ferrari, Lacchiarella, Italy

[73] Assignee: Studio Tecnico Sviluppo E Ricerche S.T.S.R. s.r.l., Milan, Italy

[21] Appl. No.: 493,313

[22] Filed: Mar. 14, 1990

[30] Foreign Application Priority Data

Mar. 31, 1989 [IT] Italy .................. 67226 A/89

[51] Int. Cl.$^5$ .................. F16K 11/074; F16K 47/02
[52] U.S. Cl. .................. 137/625.17; 137/625.4; 251/127
[58] Field of Search ........... 137/625.17, 625.4, 625.41; 251/127

[56] References Cited

U.S. PATENT DOCUMENTS

| | | | |
|---|---|---|---|
| 2,977,986 | 4/1961 | Hinderer et al. | 137/625.17 |
| 3,920,043 | 11/1975 | Fowell | 137/625.4 X |
| 4,157,099 | 6/1979 | Delker | 137/625.4 X |
| 4,362,186 | 12/1982 | Parkison et al. | 137/625.17 |
| 4,569,376 | 6/1986 | Knapp | 137/625.17 X |
| 4,697,620 | 10/1987 | Bergmann | 137/625.17 |
| 4,738,281 | 4/1988 | Limet et al. | 137/625.17 |
| 4,854,347 | 8/1989 | Knapp | 137/625.17 X |

Primary Examiner—John Rivell
Attorney, Agent, or Firm—Young & Thompson

[57] ABSTRACT

A single handle mixer valve with hard material plates, wherein a fixed member forming a delivery connection for mixed water projects up to the level of the movable plate of the valve, whose cavity forming the duct for water passage encircles the delivery connection by engaging the same, in order to offer a guide for the swinging displacements of the movable plate, whilst the delivery connection acts as a fulcrum therefor. The cavity of the plate may be blind or it may tranverse right through the plate, which in this latter case sealingly cooperates with a control head which closes the cavity. Preferably the delivery connection is a part of a supporting member for the fixed plate of the valve; a member of a wear resistant material having a low friction coefficient is inserted within the cavity of the movable plate; and some portions of this latter member, the control head or the movable plate itself are shaped so as to exert a preclosure action.

11 Claims, 3 Drawing Sheets

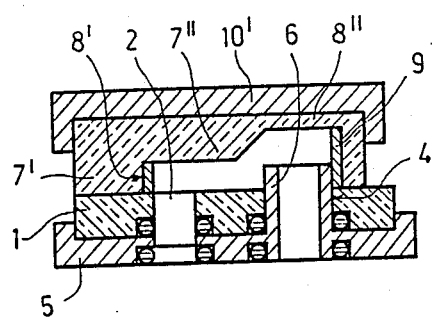
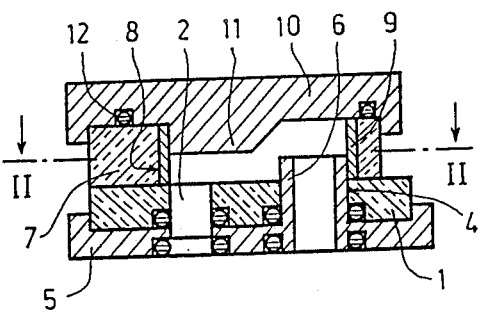
FIG. 5  FIG. 1
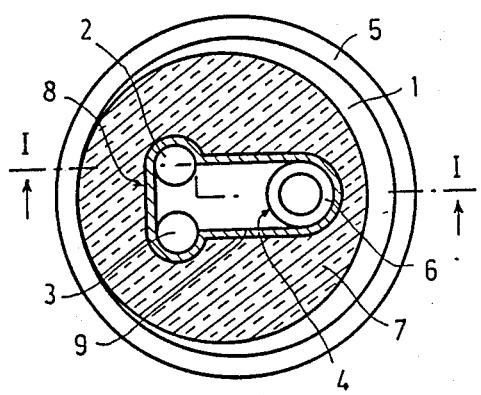
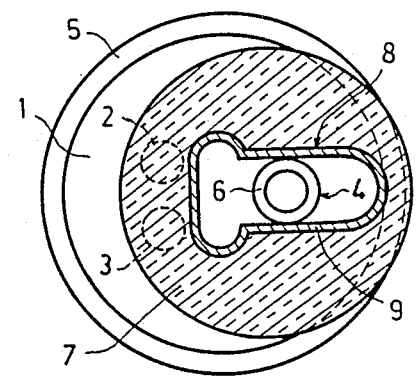
FIG. 2  FIG. 3
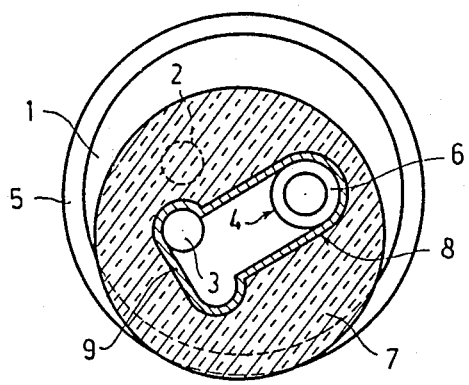
FIG. 4

4,986,306

SINGLE HANDLE MIXER VALVE WITH HARD MATERIAL PLATES, HAVING A MOVABLE PLATE SWINGING AROUND THE DELIVERY CONNECTION

BACKGROUND OF THE INVENTION

This invention relates to a single handle mixer valve with hard material plates, of the type wherein the movable plate is mounted swingable around a fulcrum.

Among the various possibilities in mounting and guiding the movable plate of a single handle mixer valve with hard material plates, it is known that said plate may be mounted swingable around a fulcrum. This kind of installation is preferred for certain applications, and among its advantages it is to be remembered that the limited displacement extension of the swingable plate aids in maintaining a layer of lubricating grease between the fixed plate and the movable plate, thus ensuring a quiet and regular operation of the valve for a sufficiently long period of time.

In the known embodiments, the movable plate has a tail portion guided in a casing which encloses the valve mechanisms, thus forming a fulcrum; or the movable plate has a projectiong tooth, forming a fulcrum, which engages a fixed guide member; or even the movable plate has a slit engaged by a fixed tooth forming a fulcrum. However such embodiments need relatively complicated shapes of the movable plate, whose manufacturing costs are therefore increased. Moreover, in most cases, with this kind of swingable plates, there are difficulties in providing the valve with preclosure means. Preclosure means are desirable in order to attain a more gradual behaviour of the valve, particularly when reduced flows are delivered, and in order to reduce the noise produced by the valve.

SUMMARY OF THE INVENTION

The main object of the present invention is to improve the kind of valves referred to, by giving the possibility of attaining a correct operation without need for complicated shapes of the movable plate.

Another object of the invention is to allow a possible and easy provision of effective preclosure means for the kind of valves referred to, without overburden the manufacture from the economical point of view.

These objects are attained, according to the invention, in that a fixed member forming a delivery connection for mixed water is arranged to extend up to the level of the movable plate, and this latter is provided with a cavity, forming a duct for water passage, which encircles said member forming a delivery connection and engages the same, thus forming between said movable plate and said fixed member a kinematic coupling which allows both rotation and translation of the movable plate with respect to said fixed member which latter acts as a fulcrum.

Said cavity of the movable plate, which forms a duct for water passage, may be blind, or even it may pass right through the movable plate, the movable plate sealingly cooperating, in this latter case, with a control head which closes said cavity.

Preferably said member forming a delivery connection is a part of a supporting member for the fixed plate of the valve, and it traverses a corresponding delivery passage formed in the fixed plate. Preferably, moreover, a member of a wear resistant material having a low friction coefficient is inserted within said cavity of the movable plate, and it forms a kinematic coupling with said member acting as a fulcrum.

Thanks to the main arrangement according to the invention, the movable plate does not require any complicated shape nor any special part foreseen in order to cooperate with the fulcrum, because this cooperation is ensured by the same cavity which, in any event, should be provided in the movable plate for allowing water passage. When said member forming a kimematic coupling with the fulcrum is provided for, there is avoided any direct contact of the fulcrum with the hard material forming the movable plate, which could produce friction and wear. Because the delivery connection extends up to the level of the movable plate of the valve, it is easy to foresee preclosure means suitable for cooperating with said delivery connection. In particular, such preclosure means may consist in a particular shape of the movable plate itself, and/or of the member inserted therein for forming the kinematic coupling, or even, when the cavity traverses right through the movable plate, by the control head coupled with the movable plate.

BRIEF DESCRIPTION OF THE DRAWINGS

The above characteristics and others and the advantages of the subject of the invention will appear more clearly from the following description of some embodiments, given as non limitative examples, diagrammatically shown in the appended drawings, wherein:

FIG. 1 shows the axial section of a pair of hard material plates of a mixer valve, along with the members directly coupled therewith, in the condition of complete opening;

FIG. 2 shows a cross section thereof taken along line II—II of FIG. 1;

FIGS. 3 and 4 show sections similar to those of FIG. 2, but with the plates in the condition of complete closure and, respectively, in the condition of opening of only one of the inlet passages;

FIG. 5 shows an axial section similar to that of FIG. 1, but relating to an embodiment in which the cavity of the movable plate is blind and it does not traverse the movable plate;

DETAILED DESCRIPTION OF THE PREFERRED EMBODIMENTS

Figure 6:
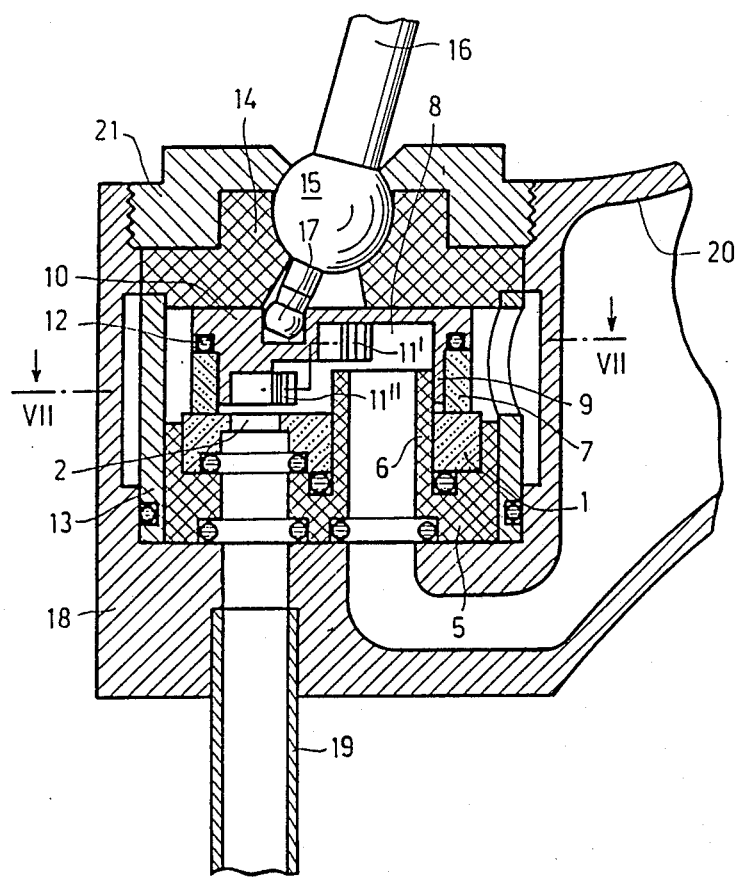
FIG. 6 shows an axial section of the complete mechanism of a mixer valve including the device according to FIG. 1.

With reference at first to FIGS. 1 to 4, the reference number 1 designates a fixed plate of hard material, having any shape per se known, wherein there are made two passages 2 and 3 for inlet of hot and cold water, and a passage 4 for delivery of mixed water. The fixed plate 1 is supported by a member 5, preferably of plastics, with respect to which the fixed plate seals by means of suitable packings. Further packings are shown by the supporting member 5 in order to cooperate, in a manner per se known, with other valve parts.

The characteristic feature of the supporting member 5 is that it comprises a member 6, forming a delivery connection, which traverses the delivery passage of the fixed plate 1 and extends up to a level higher than that of the top working surface of the fixed plate 1. Therefore member 6 attains a level in which extends a movable plate 7 superimposed to the fixed plate 1 and contacting the same. Customarily the delivery passage 4 of the fixed plate 1 is out of center, and therefore the member 6 which traverses said passage also serves to establish the position of the fixed plate 1 with respect to the supporting member 5. Therefore there is no more the usual need to provide a special reference means for this purpose.

The movable plate 7 has a cavity 8 which, in the present case, traverses right through the movable plate 7. Cavity 8 has substantially the shape of a "T", as it appears from FIGS. 2 to 4. The shaft of the "T", which in this case extends diametrically, engages like a slider the member 6 forming a delivery connection. The thus resulting kitematic coupling allows the movable plate 7 to displace along the diametrical direction of the shaft of "T" (FIGS. 2 and 3) as well as to angularly swing around the member 6, which acts as a fulcrum (FIGS. 2 and 4).

Thanks to these displacements, the movable plate 7 may open in register with its own cavity 8 both inlet passages 2 and 3 of the fixed plate 1 (FIG. 2), or only one of said inlet passages (FIG. 4), or even no inlet passage (FIG. 3). The described positions of the movable plate, and the positions intermediate among them, allow a complete control of the flow of hot and cold water, both in terms of flow rate and in terms of mixing ratio. The water mixed within the cavity 7 is in any event directed to the delivery connection 6.

Number 9 designates a member, preferably but not necessarily of plastics, which is inserted within the cavity 8 of the movable plate 7 and lines its inner periphery by substantially following the outline thereof. This member 9, solid with the movable plate 7, improves the kinematic coupling of the movable plate 7 with the fixed connection 6 acting as a fulcrum. A suitable selection of the materials forming the members 6 and 9 allows ensuring a good smoothness of the kinematic coupling which guides the movable plate 7 and preventing a premature wear of the parts. The inner surface of cavity 8 of the hard material movable plate 7 could hardly be worked up to a sufficiently reduced degree of roughness in order to avoid wear of the fulcrum 6, and in any event such working would increase the manufacturing cost of the movable plate. Any such difficulty is avoided by inserting the additional member 9.

As already stated, in this embodiment the cavity 8 traverses right through the movable plate 7. Therefore a head 10, connected to the movable plate 7 in order to control its displacements, should be sealingly coupled by means of a packing 12, so as to close the cavity 8 by forming a cover therefor.

As shown by FIG. 1, the control head 10 may have a portion 11 protruding inside the cavity 8 of the movable plate 7 in such a position as to skim the top end of the delivery connection 6 when the movable plate 7 is displaced towards the closure position. In this extremely easy manner, which does in no way increase the manufacturing cost of the control head, an effective preclosure means acting at the delivery side of the valve may be realized, when required.

FIG. 5 shows how the characteristic features of the invention may also be applied in the case in which the cavity of the movable plate does not traverse the plate, but it is blind. The shape of the fixed plate 1 and that of the supporting member 5 are identical to those already described, and these various parts are designated by the same numbers. The movable plate 7' differs from the movable plate 7 according to FIG. 1 in that its cavity 8', instead of traversing right through the movable plate, is blind, because it is closed at top by a roof 8". Also in this case it is suitable that the inner peripheral surface of cavity 8 is equipped with a suitably shaped member 9, made of a wear resistant material having a low friction coefficient, which improves the kinematic coupling with the delivery connection 6 acting as a fulcrum. In this case there is no need for the control head 10' to be sealingly coupled with the movable plate 7', and the packing 12 according to FIG. 1 may be omitted. When a preclosure means, capable of acting in a manner similar to that of the preclosure means 11 according to FIG. 1, is required, it may be formed by a correspondingly shaped portion 7" of the movable plate 7' itself, and more particularly of its roof 8".

Figure 7:
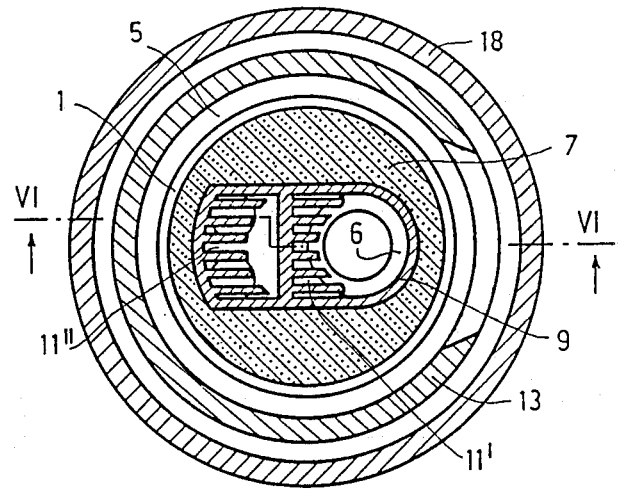
FIG. 7 shows a cross section thereof taken along the broken line VII—VII of FIG. 6.

FIGS. 6 and 7 show how the characteristic components of the invention, shown in FIGS. 1 and 2, may be integrated into the mechanism of a single handle mixer valve, and they further show other developments of the invention. The fixed plate 1 with its passage openings, the supporting member 5 with the member 6 forming a delivery connection and acting as a fulcrum, and the movable plate 7, do not substantially differ from the corresponding parts according to FIGS. 1 and 2. They are designated by the same reference numbers and will not be further described here. These components are housed within a casing 13, which defines a cartridge inserted within the hollow body 18 of a valve. The hollow body 18 is provided with inlet connections 9 and a delivery spout 20 and is closed by a cover 21. In certain cases the casing 13 could be integral with the supporting member 5. The cartridge defined by casing 13 is completed at top by a part 14 forming a half bearing for an articulation ball 15 of a control lever 16. This lever 16 has at its inner end a ball arm 14 which engages a cavity of the control head 10 in order to manoeuver the same. The control head 10 is connected to the movable plate 7 and it is sealingly coupled thereto by means of a packing 12.

As it may be seen in FIG. 6, in those cases in which cavity 8 traverses right through the movable plate 7, the member 9, which is located in the interior of the cavity 8 in order to improve the kinematic coupling, may be formed by an integral projection of the control head 10 coupled with the movable plate 7. In addition to the portion 11' forming a preclosure means by cooperating with the delivery connection 6, or in replacement of said portion 11', the control head 10 may have a portion 11" so located as to cooperate in a similar manner with the inlet passages, as the passage 2, which are made in the fixed plate 1. As it may be seen in FIG. 7, these portions 11' and 11" shown by the control head 10 may have a lamellar shape in order to effect a more gradual preclosure action. The shown lamellar shape could be replaced by a teeth-like form or the like.

It should be understood that even when the preclosure means are formed by a shaping of the movable plate itself, as according to FIG. 5, they may be disposed in a manner similar to that shown in FIG. 6 in order to cooperate with the inlet passages of the fixed plate in addition to, or instead of, cooperating with the delivery connection. Moreover, also in this case the preclosure means may have a lamellar shape, the form of teeth or the like, in order to exert a more gradual preclosure action.

Figure 8:
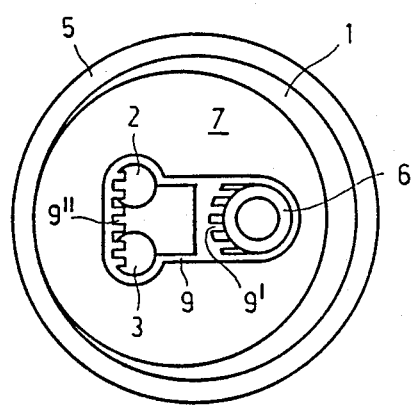
FIGS. 8 and 9 show in plan view, in the conditions corresponding to FIGS. 2 and 3, respectively, a pair of plates wherein the preclosure means are formed by the member inserted within the cavity of the movable plate in order to form a kinematic coupling with the delivery connection acting as a fulcrum.
Figure 9:
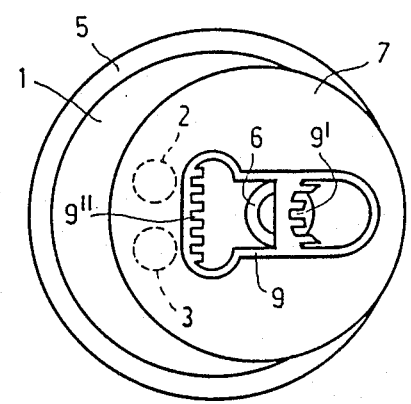

In any event, when the member 9 inserted within the cavity of the movable plate 7 in order to improve the kinematic coupling with the fulcrum 6 is independent from the control head, it may have have portions 9' arranged for effecting a preclosure action with respect to the delivery connection 6, and/or portions 9' arranged for effecting a preclosure action with respect to the inlet passages 2 and 3, as shown by FIGS. 8 and 9.

It has been stated that it is of advantage that the member 6 forming a delivery connection and acting as a fulcrum for the movable plate 7 is a part of a supporting member 5 for the fixed plate 1. However it is to be understood that in certain cases this member forming a delivery connection may also be formed by a tubular projection of the fixed plate 1, following the outline of the delivery passage 4 thereof, or even by a separate member, inserted within the delivery passage 4 of the fixed plate 1 and fixed therein.

Although in the shown examples the hard material plates 1 and 7 have been designed of circular form, it is to be understood that they may have any desired or constructively needed outline. However, in any event, thanks to the application of the invention the outline of the plates is in no way imposed or limited by the needed coupling with a fulcrum. This allows a larger freedom in design and, in general, the possibility of choosing more simple forms, which may be economically realized on an industrial scale.

All described particulars may be replaced by technically equivalent means, without modifying the operation of the device according to the invention.

What is claimed is:

1. A single handle mixer valve comprising a fixed plate and a movable plate superimposed on and contacting said fixed plate, both said plates being made of a hard material, said fixed plate having at least two inlet passages for hot and cold water and a delivery passage for mixed water, and said movable plate having a cavity forming a duct for water passage, the mixer valve further comprising a fixed member forming a delivery connection for mixed water, said fixed member extending up to the level of the movable plate and being engaged within said cavity of the movable plate and forming between said movable plate and said fixed member a kinematic coupling which allows both rotation and translation of the movable plate relative to said fixed member, whereby said movable plate may swing around said fixed member acting as a fulcrum, which guides the displacements of the movable plate.

2. A mixer valve as set forth in claim 1, wherein said cavity of the movable plate, which forms a duct for water passage, is blind.

3. A mixer valve as set forth in claim 1, wherein said cavity of the movable plate, which forms a duct for water passage, traverses right through the movable plate, and further comprising a control head connected to said movable plate, said movable plate and control head being sealingly coupled the one another and said control head closing said cavity of the movable plate.

4. A mixer valve as set forth in claim 1, further comprising a supporting member for said fixed plate, and wherein said fixed member forming a delivery connection is a part of said supporting member for the fixed plate, and it traverses said delivery passage formed in the fixed plate.

5. A mixer valve as set forth in claim 1, wherein a member made of a wear resistant material having a low friction coefficient is inserted within said cavity of the movable plate, and it improves said kinematic coupling between said movable plate and said fixed member acting as a fulcrum.

6. A mixer valve as set forth in claim 5, wherein said cavity of the movable plate traverses right through the movable plate, and further comprising a control head connected to said movable plate, said member inserted within the cavity of the movable plate being an integral portion of said control head.

7. A mixer valve as set forth in claim 1, further comprising preclosure means located, when the valve approaches its closed condition, in regions registering with said fixed member forming a delivery connection and/or with said inlet passages of the fixed plate.

8. A mixer valve as set forth in claim 7, wherein said preclosure means have a substantially lamellar shape, a tooth-like shape or a like shape.

9. A mixer valve as set forth in claim 7, wherein said preclosure means are formed by portions of said movable plate.

10. A mixer valve as set forth in claim 7, further comprising a control head connected to said movable plate, wherein said preclosure means are formed by portions of said control head.

11. A mixer valve as set forth in claim 7, further comprising a member made of a wear resistant material inserted within said cavity of the movable plate, wherein said preclosure means are formed by portions of said member inserted within the cavity of the movable plate.

* * * * *